United States Patent [19]

Fuchs, Jr.

[11] Patent Number: 4,947,669

[45] Date of Patent: Aug. 14, 1990

[54] APPARATUS FOR PROVIDING TUBING WITH AT LEAST ONE INTERNAL SPINAL FIN

[75] Inventor: Francis J. Fuchs, Jr., Naples, Fla.

[73] Assignee: R. Gale Rhodes, Jr., Rumson, N.J. ; a part interest

[21] Appl. No.: 421,505

[22] Filed: Oct. 13, 1989

[51] Int. Cl.⁵ .............................................. B21C 37/20
[52] U.S. Cl. ........................................... 72/77; 72/283
[58] Field of Search .......................... 72/68, 77, 95, 283

[56] References Cited

U.S. PATENT DOCUMENTS 4,702,096 10/1987 Fuchs, Jr. ............................. 72/283

FOREIGN PATENT DOCUMENTS 139225 10/1981 Japan ..................................... 72/283
202124 11/1984 Japan ..................................... 72/283

Primary Examiner—Lowell A. Larson
Attorney, Agent, or Firm—R. Gale Rhodes, Jr.

[57] ABSTRACT

Multi-stage ball bearing assembly mounted internally of a floating plug or the forward end of a mandrel and including a plurality of axially aligned ball bearings for enabling rotation of a spinner for forming at least two internal spiral grooves in the inner portion of tubing upon relative motion therebetween to produce at least one spiral fin internally of the tubing. The ball bearings include inner and outer ball tracks and a plurality of spherical balls which roll between the tracks. Predetermined ones of the outer ball tracks are displaced axially with respect to the inner ball tracks in the same direction as the relative movement between the tubing and the spinner to provide relief space in the direction of relative movement which, upon rotation being imparted to the spinner which in turn imparts rotation load to the multi-stage ball bearing assembly in the same direction of such relative movement, causes the rotation load to be distributed substantially equally between the ball bearings.

10 Claims, 1 Drawing Sheet

APPARATUS FOR PROVIDING TUBING WITH AT LEAST ONE INTERNAL SPINAL FIN

BACKGROUND OF THE INVENTION

This invention relates generally to new and improved apparatus for providing the internal portion of tubing with at least one internal spiral fin and more particularly is an improvement of the invention disclosed in U.S. Pat. No. 4,702,096 issued Oct. 27, 1987 to Francis J. Fuchs, Jr., entitled APPARATUS AND PROCESS FOR PROVIDING TUBING WITH AT LEAST ONE INTERNAL SPIRAL GROOVE OR FIN; this patent is hereby incorporated herein by reference as if fully set forth herein and will be referred to hereinafter as the "Fuchs '096 Patent." Accordingly, it will be understood that the apparatus of this invention is for the same purpose as the apparatus disclosed in the Fuchs '096 Patent and for overcoming the same prior art problems taught in the BACKGROUND OF THE INVENTION of the Fuchs '096 Patent.

As will be better understood from the detailed description of the present invention set forth below, the apparatus of the present invention is shorter and more compact than the apparatus of the Fuchs '096 Patent, particularly that shown in FIGS. 7 and 8, and unlike the apparatus of the Fuchs '096 Patent the multi-stage ball bearing assembly of the present invention extends inwardly of, instead of outwardly from, the floating plug or forward portion of the mandrel to which the assembly is mounted thereby making the assembly less subject to damage and axial misalignment. Also, it has been found that mounting the multi-stage ball bearing assembly inwardly of the floating plug or forward portion of the mandrel makes the removal and replacement of the spinner easier, less time consuming and therefore more efficient to maintain.

SUMMARY OF THE INVENTION

Multi-stage ball bearing assembly mounted internally of a floating plug or the forward end of a mandrel and including a plurality of axially aligned ball bearings for enabling rotation of a spinner for forming at least two internal spiral grooves in the inner portion of tubing upon relative motion therebetween to produce at least one spiral fin internally of the tubing. The ball bearings include inner and outer ball tracks and a plurality of spherical balls which roll between the tracks. Predetermined ones of the outer ball tracks are displaced axially with respect to the inner ball tracks in the same direction as the relative movement between the tubing and the spinner to provide relief space in the direction of relative movement which, upon rotation being imparted to the spinner which in turn imparts rotation load to the multi-stage ball bearing assembly in the same direction of such relative movement, causes the rotation load to be distributed substantially equally between the ball bearings.

DESCRIPTION OF THE PREFERRED EMBODIMENT

Figure 1:
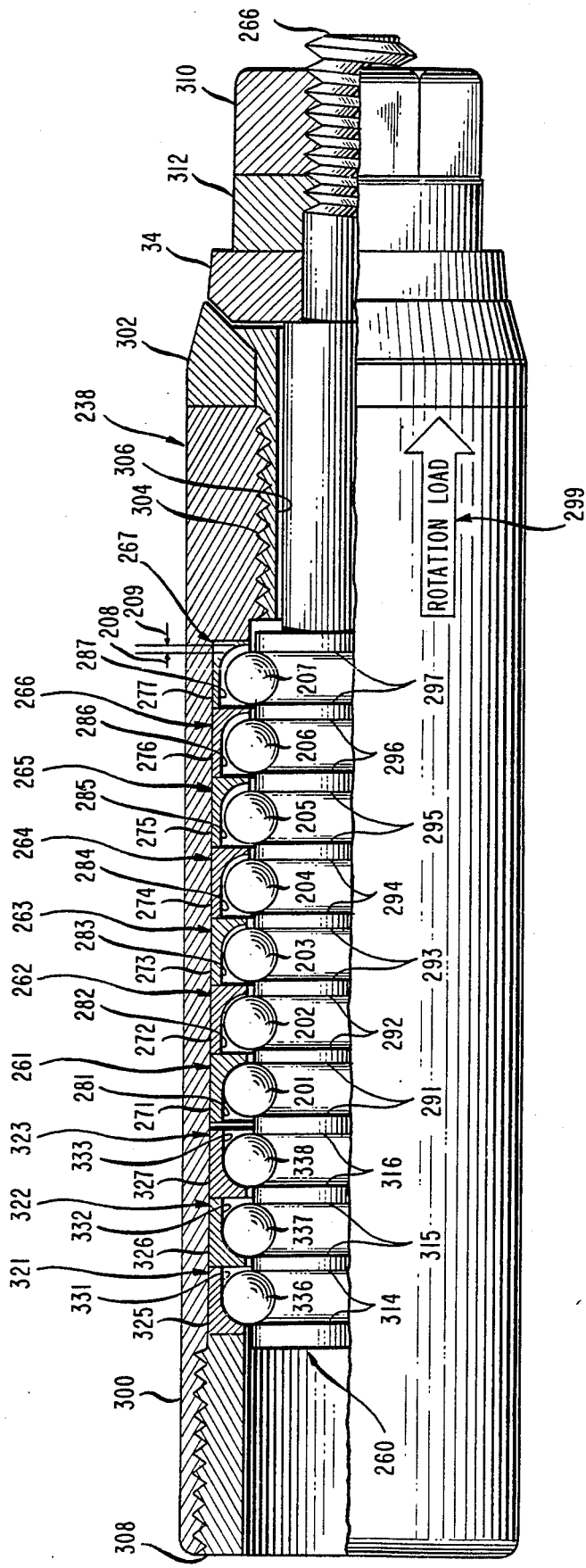
FIG. 1 is a side elevational view of a multi-stage ball bearing assembly embodying the present invention; the view is a horizonally split view with the upper portion being shown generally in cross-section and with the lower portion being shown in solid outline.

As noted above, the present invention is an improvement of apparatus disclosed in Fuchs '096 Patent and more particularly it will be understood that the apparatus shown in FIG. 1 is an improvement of the apparatus shown in FIGS. 7 and 8 of the Fuchs '096 Patent. It will be further understood that the apparatus shown in FIG. 1 may be mounted on the end of a floating plug such as floating plug 38 shown in FIG. 4 of the Fuchs '096 Patent for utilization with the draw die 32 and draw blocks 42 also illustrated in FIG. 4 of the Fuchs '096 Patent to produce tubing provided with at least one internal spiral fin. Still further, it will be understood that the apparatus shown in FIG. 1 may be mounted on the forward portion of a mandrel embodied in a continuous extrusion apparatus for continuously producing tubing provided with at least one internal spiral fin and may be, for example, mounted in a recess provided in the forward portion of the mandrel 149 for utilization with the continuous extrusion apparatus 140 both shown in FIG. 10 of the Fuchs '096 Patent. Accordingly, for convenience of reference and comparative understanding of the differences between the present invention and the structure disclosed in FIGS. 4, 7 and 8 of the Fuchs '096 Patent, structure shown in FIG. 1 corresponding to structure shown in FIGS. 4, 7 and 8 of the Fuchs '096 Patent will be given corresponding numerical designations incremented by 200 except for the spinner 34 which will be given the same numerical designation.

Referring then to FIG. 1, apparatus embodying the present improvement invention may include a floating plug indicated by general numerical designation 238, spinner 34 mounted on shaft 266 for rotation therewith and a multi-stage ball bearing assembly indicated by general numerical designation 260 mounted internally of the floating plug 238 and including a plurality of axially aligned ball bearings indicated, respectively, by general numerical designations 261-267. The assembly 260 further includes a a plurality of axially displaced, radially inwardly extending spherical grooves 291-297. The assembly 260 further includes a plurality of axially aligned, generally annular, cup-shaped members 271-277 provided, respectively, with inwardly extending recesses 281-287 extending axially in the forward direction indicated by the arrow 290 shown at the top of FIG. 1. [As in the Fuchs '096 Patent, the expression "forward direction" as used herein refers to the direction of the relative movement of the tubing (e.g. tubing 10A shown in FIG. 4 of the Fuchs '096 Patent moving in the "forward direction" as indicated by the arrow 44 of such FIG. 4) with respect to the spinner during groove, grooves, or fin forming in the tubing internal portion, and the expression "rearward direction" refers to the direction opposite to the "forward direction"; it will be understood that the spinner may be stationary and the tubing moved, or the tubing may be stationary and the spinner moved, or each may be moved, but the significant consideration is the "relevant" direction of movement of the tubing with respect to the spinner.] The recesses 281-287 formed in the cups 271-277 provide outer ball tracks and the grooves 291-297 formed in the shaft 266 provide inner ball tracks between which roll spherical balls 201-207.

In accordance with the further teachings of the present improvement invention, and referring still to FIG. 1, it will be noted that the outer ball tracks comprised of the recesses 281-287 formed in cups 271-277 are displaced axially in the forward direction with respect to the inner ball tracks comprised of the grooves 291-297. This axial displacement provides relief space between the spherical balls and the outer tracks in the forward direction with such relief space being indicated by way of example by the arrows 208 and 209 shown in the upward portion of FIG. 1 indicating the axial relief space between the spherical ball 207 and the recess 287 in the forward direction. In accordance with the still further particular aspects of the present improvement invention, it will be further understood as noted from FIG. 1 that successive ones of the outer ball tracks are displaced axially with respect to the inner ball tracks increasingly greater distances in the forward direction (direction indicated by arrow 290) to provide increasingly greater relief space in the forward direction between the outer ball tracks and the spherical balls which roll therein to cause the plurality of bearings 261-267 to assume a rotation load, indicated by the enlarged arrow 299, imparted to the multi-stage ball bearing assembly 260 by the spinner 34 during fin forming, sequentially and successively in the forward direction whereby the rotation load is assumed equally, or substantially equally, by each ball bearing; this rotation load distribution is taught in detail in the Fuchs '096 Patent beginning at Column 4, line 27 and being illustrated in FIGS. 7 and 8 of the Fuchs '096 Patent although it will be expressly understood that the assumption of the rotation load by the ball bearings 261-267 of the present invention is assumed sequentially and successively from the forward direction and opposite to the assumption of the sequential and successive load assumption by the ball bearings 61-65 shown in FIGS. 7 and 8 of the Fuchs '096 Patent which assume the rotation load in the rearward direction (right to left as viewed in FIGS. 7 and 8 of the Fuchs '096 Patent). Accordingly, it will be further understood that upon rotation load being imparted to the multi-stage ball bearing assembly 260 by the rotating spinner 34, the ball bearings 261-267 of the assembly 260 will assume the rotation load sequentially and successively in the forward direction due to the displacement of the outer ball tracks axially in the forward direction with respect to the inner ball tracks in increasingly greater axial amounts as illustrated in FIG. 1.

The multi-stage ball bearing assembly 260 may be provided with a second plurality of axially aligned ball bearings indicated, respectively, by general numerical designations 321-323. This second plurality of ball bearings accommodates a rotation load imparted to the multi-stage ball bearing assembly 260 acting in the rearward direction or in the direction opposite to the rotation load indicated by the arrow 299 and referred to above. Such rearwardly acting rotation load could occur, for example, upon a stoppage or jam in the groove forming by the spinner 34 into the internal portion of the tubing caused, for example, by the spinner striking an unusually hard portion of the tubing. To clear the stoppage or jammed condition, it could be necessary to produce relative movement between the spinner 34 and the tubing in the rearward direction by imparting rearwardly acting force to the tubing and/or spinner which rearwardly acting force could impart rotation to the spinner and hence impart the rotation load acting in the rearward direction or in the direction opposite to the direction indicated by the arrow 299. The plurality of axially aligned ball bearings 321-323 may be comprised of a second plurality of axially displaced, radially inwardly extending spherical grooves 314-316 formed in the rearward portion of the shaft 266 as shown in FIG. 1, a second plurality of axially aligned generally annular cup-shaped members 325-327 provided, respectively, with inwardly extending recesses 331-333 extending axially in the rearward direction. The recesses 331-333 formed in the cups 325-327 provide outer ball tracks, and the grooves 314-316 formed in the shaft 266 provide inner ball tracks between which roll spherical balls 336-338. In the preferred embodiment of the present invention, the recesses 331-333 are aligned axially with, and not axially displaced from, the inwardly extending grooves 314-316; however, if it is desired for the bearings 321-323 to sequentially assume the rotation load acting in the rearward direction the outer ball tracks provided by the recesses 331-333 may be displaced axially with respect to the inner ball tracks provided by the spherical grooves 314-316 increasingly greater distances in the forward direction (direction of the arrow 290) to cause the bearings 321-323 to assume the rearward acting rotation load sequentially and successively in the forward direction (direction of arrow 290).

As to the detailed structure of the floating plug indicated by general numerical designation 238 as shown in the embodiment of FIG. 1, it will be understood that the floating plug 238 may include a generally cylindrical, hollow outer member 300, a forward generally annular member 302, a forward generally annular seating member 304 provided with a central aperture 306 for surrounding the forward portion of the shaft 266 and provided with external threads for threadedly engaging internal threads provided on the forward portion of the cylindrical member 300 to seat and mount the forward annular member 302 to the cylindrical member 300, and a rearward seating generally annular seating member 308 for seating and mounting the pluralities of generally cup-shaped annular members 261-267 and 321-323 to the cylindrical member 300 and thereby through the pluralities of spherical balls 201-207 and 336-338, the shaft 266 rotatably internally of the cylindrical member 300, the annular seating member 308 is provided with external threads for threadedly engaging internal threads provided internally of the rearward portion of the cylindrical member 300 as shown in FIG. 1; alternatively the seating member 308 could be a solid cylindrical plug-like member for also closing the rearward portion of the floating plug 238. It will be further understood that in assembly the pluralities of spherical balls 201-207 and 336-338 and the pluralities of generally annular cup-shaped members 271-277 and 325-327 are assembled to the shaft 266 and thereafter inserted into the cylidnrical member 300 from the rear after which the annular seating member 308 is threadedly engaged into the rearward portion of the cylindrical member 300; the spinner 34 is then inserted over the reduced diameter forward portion of the shaft 266 and mounted for rotation with the shaft by a nut 310 and intermediate washer or spacer 312; the forward external portion of the shaft 266 is threaded as shown for threaded engagement by the internal threads provided on the nut 310. It has been discovered that by making the outer cylindrical member 300 and the annular member 302 in two pieces an economy and efficiency can be achieved; namely, since the outer cylindrical member 300 experiences less wear than the forward annular member 302 upon the tubing (e.g. tubing 14A shown in FIG. 4 of the Fuchs '096 Patent) passing thereover during groove and fin forming by the spinner 34, the larger outer cylindrical member 300 may be made of less expensive tool steel and the smaller forward annular member 302 may be made of the more expensive and more wear resistant tungsten carbide.

It will be understood by those skilled in the art that many variations and modifications may be made in the present invention without departing from the spirit and the scope thereof.

What is claimed is:

1. Apparatus for providing the internal portion of tubing with at least two internal spiral grooves to provide said tubing internal portion with at least one internal spiral fin, comprising:

spinner means provided with at least two external spiral ridges;

mounting means for mounting said spinner means rotatably, said spinner means and said mounting means for being positioned internally of said tubing;

upon relative movement of said tubing with respect to said spinner means in a predetermined direction, said internal portion of said tubing engaging said spiral ridges and imparting rotation to said spinner means to cause said spiral ridges to engage and provide said tubing internal portion with said internal spiral grooves and thereby said internal spiral fin; and said mounting means including a multi-stage ball bearing assembly mounted internally thereof and having an axis extending in said predetermined direction and including a plurality of axially aligned ball bearings, each ball bearing including inner and outer ball tracks and a plurality of spherical balls which roll between said ball tracks, predetermined ones of said outer ball tracks displaced axially with respect to said inner ball tracks in said predetermined direction to provide relief space in said predetermined direction between said predetermined outer ball tracks and the spherical balls which roll therein, upon said rotation being imparted to said spinner means said spinner means engaging and imparting rotation load in said predetermined direction to said multi-stage ball bearing assembly and said axial displacement of said outer ball tracks with respect to said inner ball tracks distributing said rotation load substantially equally between said ball bearings.

2. Apparatus according to claim 1 wherein successive ones of said outer ball tracks are displaced axially with respect to said inner ball tracks increasingly greater axial distances in said predetermined direction to provide increasingly greater relief space in said predetermined direction between said predetermined outer ball tracks and the spherical balls which roll therein for causing said plurality of ball bearings to assume said rotation load sequentially and successively in said predetermined direction.

3. Apparatus according to claim 2 wherein said multi-stage ball bearing assembly comprises a cylindrical shaft having said axis, said shaft provided with a plurality of axially displaced, inwardly extending, spherical grooves comprising said inner ball tracks; and a plurality of axially aligned, generally annular cup-shaped members surrounding said shaft, each cup-shaped member provided with a centrally formed aperture for receiving said shaft and with an axially inwardly extending recess extending axially inwardly in said predetermined direction, said recesses providing said outer ball tracks.

4. Apparatus according to claim 3 wherein said inwardly extending recesses extend inwardly increasingly greater amounts successively in said predetermined direction.

5. Apparatus according to claim 3 wherein said cylindrical shaft is provided with a second plurality of axially displaced, inwardly extending, spherical grooves comprising second inner ball tracks, wherein said multi-stage ball bearing assembly further comprises a second plurality of axially aligned, generally annular cup-shaped members surrounding said shaft, each cup-shaped member provided with a centrally formed aperture for receiving said shaft and provided with an axially extending recess extending axially inwardly in the direction opposite to said predetermined direction, said recesses providing second outer ball tracks, and a second plurality of spherical balls which roll between said second ball tracks and accommodate a rotation load imparted to said multi-stage ball bearing assembly upon rotation being imparted to said spinner by force applied thereto in a direction generally opposite to said predetermined direction.

6. Apparatus according to claim 1 wherein said mounting means comprise a floating plug and wherein said multi-stage ball bearing assembly is mounted internally of said floating plug.

7. Apparatus according to claim 6 wherein said floating plug includes a generally cylindrical outer member, and wherein said multi-stage ball bearing assembly is mounted internally of said cylindrical member and includes:

(a) a cylindrical shaft mounted rotatably in said generally annular member, said shaft provided with a plurality of axially displaced, inwardly extending, spherical grooves providing said inner ball tracks, (b) a plurality of axially aligned, generally annular cup-shaped members surrounding said shaft, each cup-shape member provided with a centrally formed aperture for receiving said shaft and with an inwardly extending recess extending in said predetermined direction, said recesses providing said outer ball tracks, wherein said generally cylindrical member includes a forward portion and wherein said cylindrical shaft includes a forward portion extending generally through and forwardly of said forward portion of said generally cylindrical member, wherein said spinner means is generally annularly shaped and provided with a central aperture for surrounding said forward portion of said cylindrical shaft and for being secured thereto for rotation therewith.

8. Apparatus according to claim 7 wherein said cylindrical shaft is provided with a second plurality of axially displaced, inwardly extending, spherical grooves comprising second inner ball tracks, wherein said multi-stage ball bearing assembly further comprises a second plurality of axially aligned, generally annular cup-shaped members surrounding said shaft, each cup-shaped member provided with a centrally formed aperture for receiving said shaft and provided with an axially extending recess extending axially inwardly in the direction opposite to said predetermined direction, said recesses providing second outer ball tracks, and a second plurality of spherical balls which roll between said second ball tracks and accommodate a rotation load imparted to said multi-stage ball bearing assembly upon rotation being imparted to said spinner by force applied thereto in a direction generally opposite to said predetermined direction.

9. Apparatus according to claim 7 wherein said spinner means includes a rearward portion inclined at an acute included angle with respect to said axis, wherein said forward portion of said generally cylindrical member is undercut at an obtuse included angle with respect to said axis, said angles being substantially equal, and wherein said undercut provides a recess for receiving said rearward portion of said spinner means to prevent build-up of tubing material between said forward portion of said generally annular member and said rearward portion of said spinner means during the providing of said grooves in said tubing internal portion.

10. Apparatus according to claim 1 wherein said mounting means comprise a mandrel having a forward portion provided with an inwardly extending cylindrical recess, wherein said multi-stage ball bearing assembly is mounted internally of said forward portion of said mandrel in said cylindrical recess and includes:

(a) a cylindrical shaft mounted rotatably in said cylindrical recess, said shaft provided with a plurality of axially displaced, inwardly extending, spherical grooves providing said inner ball tracks, (b) a plurality of axially aligned, generally annular cup-shaped members surrounding said shaft, each cup-shape member provided with a centrally formed aperture for receiving said shaft and with an inwardly extending recess extending in said predetermined direction, said recesses providing said outer ball tracks, and wherein said cylindrical shaft includes a forward portion extending generally through and forwardly of said forward portion of said mandrel, wherein said spinner means is generally annularly shaped and provided with a central aperture for surrounding said forward portion of said cylindrical shaft and for being secured thereto for rotation therewith.

* * * * *